(12) United States Patent
Kuang et al.

(10) Patent No.: US 10,830,326 B2
(45) Date of Patent: Nov. 10, 2020

(54) MECHANICAL LOCKING DIFFERENTIAL

(71) Applicant: Zhejiang CFMOTO Power Co., Ltd., Hangzhou (CN)

(72) Inventors: Zhenxiang Kuang, Hangzhou (CN); Fuying Cheng, Hangzhou (CN); Jiajun Li, Hangzhou (CN)

(73) Assignee: Zhejiang CFMOTO Power Co. Ltd., Zhejiang (CN)

( * ) Notice: Subject to any disclaimer, the term of this patent is extended or adjusted under 35 U.S.C. 154(b) by 195 days.

(21) Appl. No.: 16/040,474

(22) Filed: Jul. 19, 2018

(65) Prior Publication Data

US 2019/0024770 A1    Jan. 24, 2019

(30) Foreign Application Priority Data

Jul. 19, 2017  (CN) .................. 2017 2 0883341 U

(51) Int. Cl.
| | | |
|---|---|---|
| *F16H 48/08* | (2006.01) | |
| *F16H 48/38* | (2012.01) | |
| *F16H 48/14* | (2006.01) | |
| *F16H 48/24* | (2006.01) | |
| *F16H 48/40* | (2012.01) | |

(52) U.S. Cl.
CPC ............. *F16H 48/24* (2013.01); *F16H 48/08* (2013.01); *F16H 48/142* (2013.01); *F16H 48/40* (2013.01); *F16H 2048/385* (2013.01)

(58) Field of Classification Search
CPC .............................. F16H 48/142; F16H 48/145
See application file for complete search history.

(56) References Cited

U.S. PATENT DOCUMENTS

| | | | | | |
|---|---|---|---|---|---|
| 1,096,830 | A | * | 5/1914 | Deming ................ | F16H 48/12 |
| | | | | | 74/650 |
| 1,098,422 | A | * | 6/1914 | Bayly .................... | F16H 48/12 |
| | | | | | 74/650 |
| 1,265,160 | A | * | 5/1918 | Allen ..................... | F16H 48/12 |
| | | | | | 74/650 |
| 1,472,758 | A | * | 10/1923 | Hulett ................... | F16D 41/16 |
| | | | | | 74/650 |
| 1,566,027 | A | * | 12/1925 | Lutton ................... | F16D 41/00 |
| | | | | | 74/650 |

(Continued)

FOREIGN PATENT DOCUMENTS

| | | | |
|---|---|---|---|
| CN | 200978937 Y | 11/2007 | |
| CN | 101871529 A | 10/2010 | |
| EP | 0386866 A2 * | 9/1990 | ......... B60K 17/3505 |

*Primary Examiner* — Tisha D Lewis
(74) *Attorney, Agent, or Firm* — Jeffrey D. Shewchuk; Shewchuk IP Services, LLC

(57) ABSTRACT

A mechanical locking differential includes a driving ring in a differential housing between right and left active components. The driving ring is in line with the input bevel gear. The differential housing has a thin wall in a single, integral shell around the driving ring. Several hollow cylindrical shaft pins are used to attached the driving ring to the differential housing, with the shaft pins being driven radially relative to the transverse axis of the differential outputs in an interference fit with the housing and the driving ring. The shaft pins are held from axially backing out by two small rivets. The shaft pins preferably have a threaded inner diameter which assists in removal. The shaft pin attachment allows the bevel gear to extend closer to the transverse axis without obstruction.

15 Claims, 4 Drawing Sheets

(56) References Cited

U.S. PATENT DOCUMENTS

| | | | |
|---|---|---|---|
| 1,886,226 A * | 11/1932 | Rienerth | F16D 41/22 |
| | | | 74/650 |
| 1,922,350 A * | 8/1933 | Bolton | F16D 41/22 |
| | | | 192/48.92 |
| 2,923,174 A * | 2/1960 | Gleasman | F16H 48/22 |
| | | | 475/234 |
| 4,437,530 A | 3/1984 | De Young et al. | |
| 5,383,378 A * | 1/1995 | Paul | B60K 23/0808 |
| | | | 74/650 |
| 5,419,406 A | 5/1995 | Kawamoto et al. | |
| 5,443,130 A | 8/1995 | Tanaka et al. | |
| 5,632,185 A * | 5/1997 | Gassmann | B60K 17/351 |
| | | | 192/103 F |
| 5,919,109 A | 7/1999 | Fleckenstein | |
| 6,092,439 A | 7/2000 | Tyson et al. | |
| 6,394,246 B1 * | 5/2002 | Gassmann | F16D 43/284 |
| | | | 192/103 F |
| 7,025,702 B2 | 4/2006 | Saito et al. | |
| 8,640,801 B2 | 2/2014 | Hennings et al. | |
| 9,387,756 B1 | 7/2016 | Whiting et al. | |
| 9,630,488 B2 | 4/2017 | Koenig | |
| 2009/0014223 A1 | 1/2009 | Jones et al. | |
| 2012/0318629 A1 | 12/2012 | Lyman | |
| 2013/0041566 A1 | 2/2013 | Gagnon | |

* cited by examiner

MECHANICAL LOCKING DIFFERENTIAL

CROSS-REFERENCE TO RELATED U.S. APPLICATION(S)

None.

FIELD OF THE INVENTION

This application relates to the technical field of vehicles, and particularly to an all-terrain vehicle and a differential mechanism thereof.

BACKGROUND OF THE INVENTION

The term "all-terrain vehicle" refers to a vehicle capable of running on a wide variety of unpaved terrains that ordinary automobiles may have trouble traversing. All-terrain vehicles are commonly known as "ATVs" in the U.S. and China. ATVs commonly include differentials transmitting power from a drive shaft to half shafts, allowing a driven right wheel to rotate at a different speed than a driven left wheel. One example is disclosed in U.S. patent application Ser. No. 15/617,414, incorporated by reference. More simple and less costly designs of differentials, which can lock to minimize the likelihood of the vehicle becoming stuck and unlock when different amounts of wheel travel are called for, are needed. The differential should be as small and light as possible while still being able to amply deliver the power required of ATVs over the harsh road and environmental conditions witnessed by ATVs over years of use. The present invention is particularly an improvement over the mechanical locking differential of U.S. patent application Ser. No. 15/617,414.

BRIEF SUMMARY OF THE INVENTION

The present invention is a mechanical locking differential, the active portions of which are made up primarily of a drive ring which rotates about a transverse axis, as well as right and left driven rings that can move sideways into and out of engagement with the drive ring. The drive ring is mounted in a housing that extends from a ring gear, for mating with an input bevel gear. The housing has an integral portion which defines a cavity for the active portions of the differential, including the drive ring and the right and left driven rings. The drive ring is attached to the housing using radially extending shaft pins rather than axially extending bolts.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
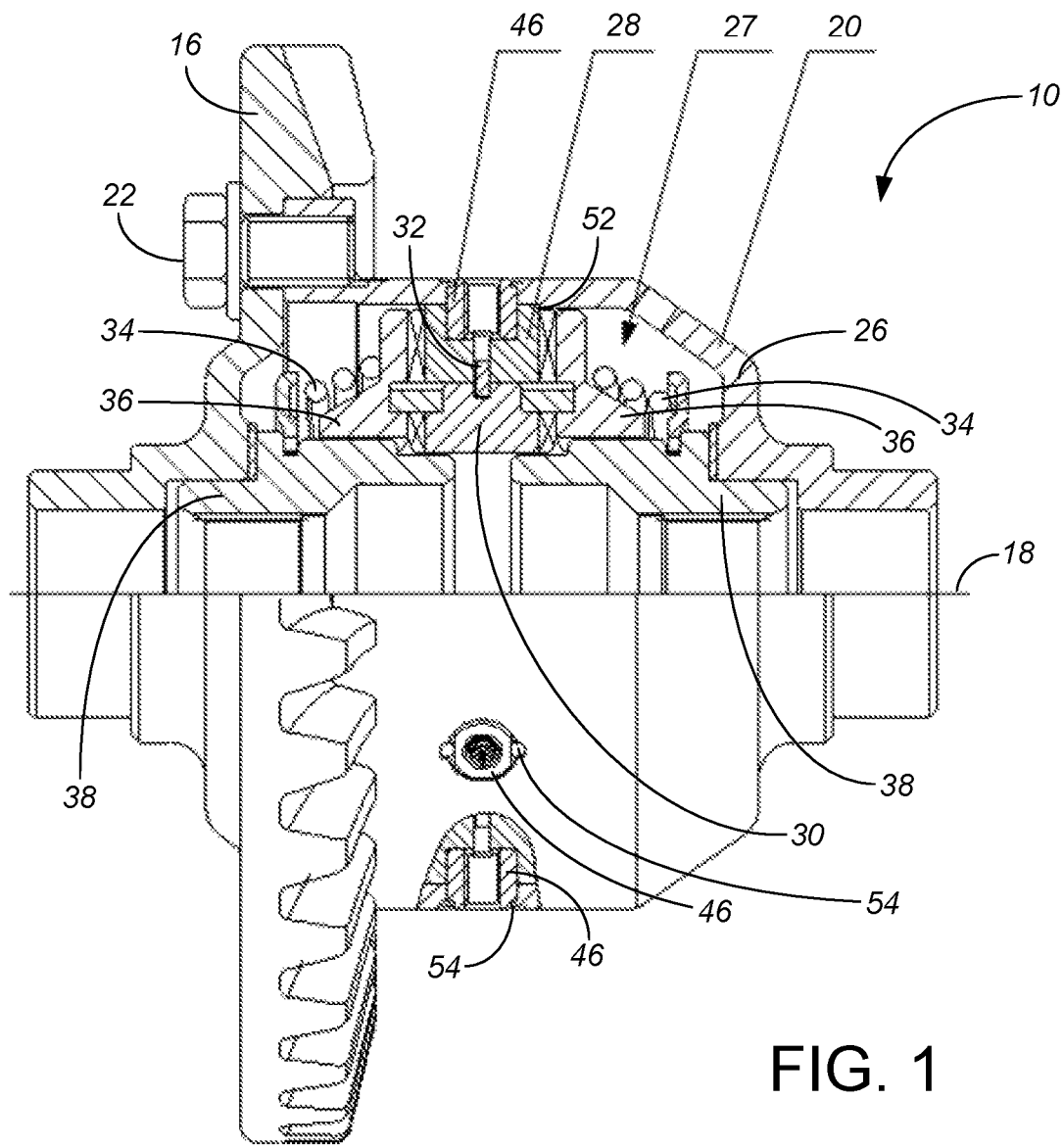
FIG. 1 is a top plan view, with a portion shown in cross-section, showing a preferred embodiment of the mechanical locking differential of the present invention.
Figure 2:
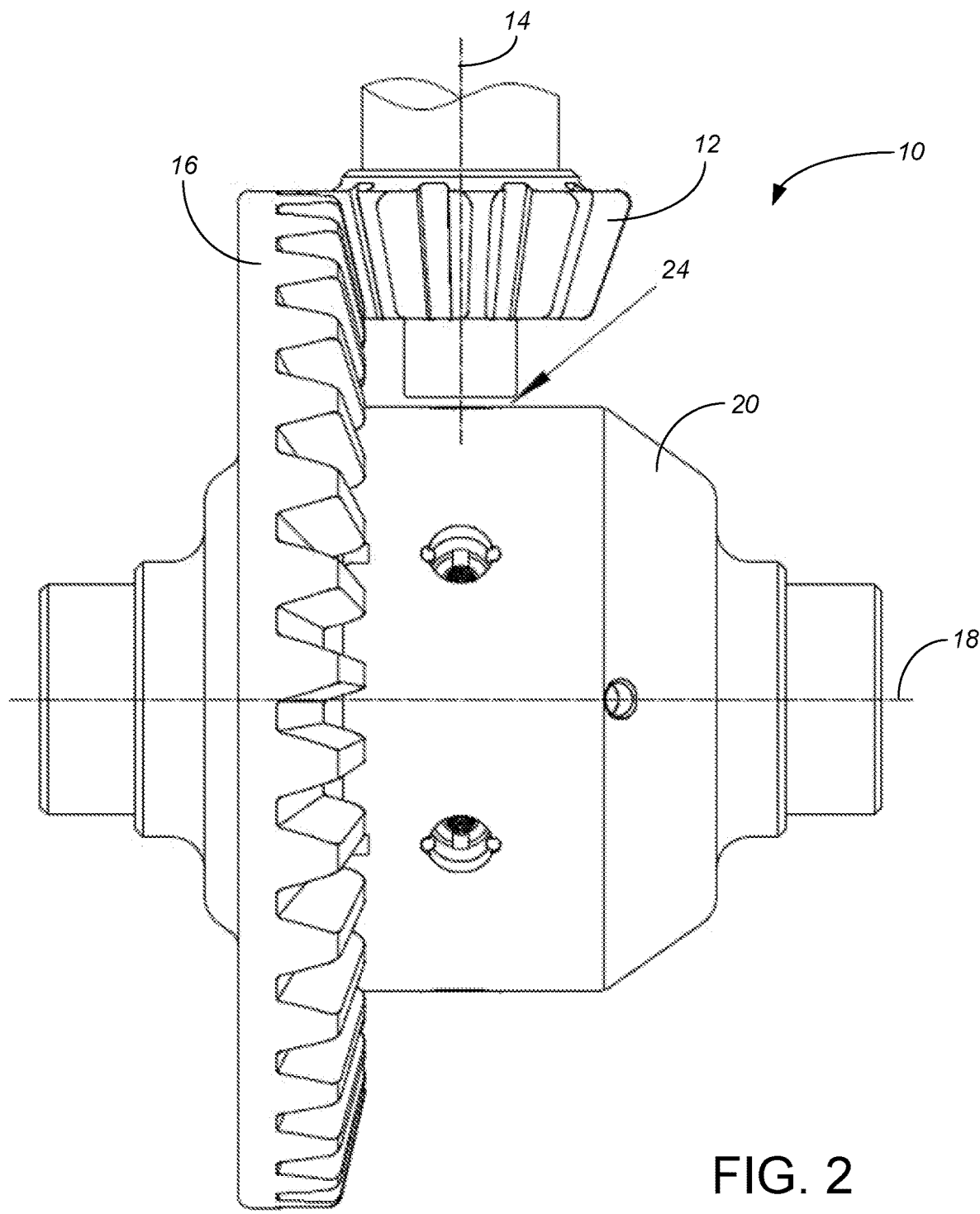
FIG. 2 is a top plan view of the mechanical locking differential of FIG. 2, showing placement of one design of input bevel gear.

A differential 10 in accordance with the present invention is shown in FIGS. 1 and 2. The differential 10 includes an input, which in most applications will involve an input bevel gear 12 such as shown in FIG. 2, rotating about a longitudinal axis 14 to deliver rotational torque from the engine (not shown) of the vehicle. The torque is transmitted to a drive ring gear 16, supported for rotation about a transverse axis 18. A differential housing 20, also called a differential shell or differential casing, is fixed to the drive ring gear 16 such as by one or more bolts 22. As seen, these bolts 22 are fairly short in length in the axial direction. This enables the input bevel gear 12 to take on any of many different configurations, such as having the shaft extension 24 shown in FIG. 2. Unlike prior art differentials, the bolts 22 do not interfere with this shaft extension 24.

As best shown in FIG. 1, the housing 20 is a single, integral structure with a relatively thin wall 26 that defines a cavity for the active components 27 of the differential 10. In the most preferred embodiment, the wall 26 is only about 3.5 mm thick. In contrast to the split shell housing of U.S. patent application Ser. No. 15/617,414, the housing 20 has a smaller weight and volume. Because the housing 20 itself is a single component, assembly of the differential 10 is easier.

In the preferred embodiment, the active components 27 are substantially as taught in U.S. patent application Ser. No. 15/617,414, incorporated by reference. Thus, the centered active components include a driving ring 28 and a central ramping separator ring 30 positioned relative to the driving ring 28 by a snap ring 32. To the right and left of the centered active components, on each side, are a spring 34, driven ring 36 and spline sleeve 38, all operating as discussed in U.S. patent application Ser. No. 15/617,414. The spline sleeve 38 provide the outputs for the differential 10, driving the wheels (not shown) of the vehicle, which can either be locked relative to the driving ring 28 or be unlocked relative to the driving ring 28. Other active components could alternatively be used within the housing 20 in conjunction with the present invention. Regardless of the active components, to make best use of the present invention, the important consideration is the desire to make the housing 20 as small and light as possible, leaving as much room for the input bevel gear 12 as possible, while still achieving the locking differential function. Moreover, the most important location that the housing 20 needs to be small is where it lines up with the bevel gear 12, so the distance between the end of the bevel gear 12 and the transverse axis 18 can be made smaller as necessary.

Figure 3:
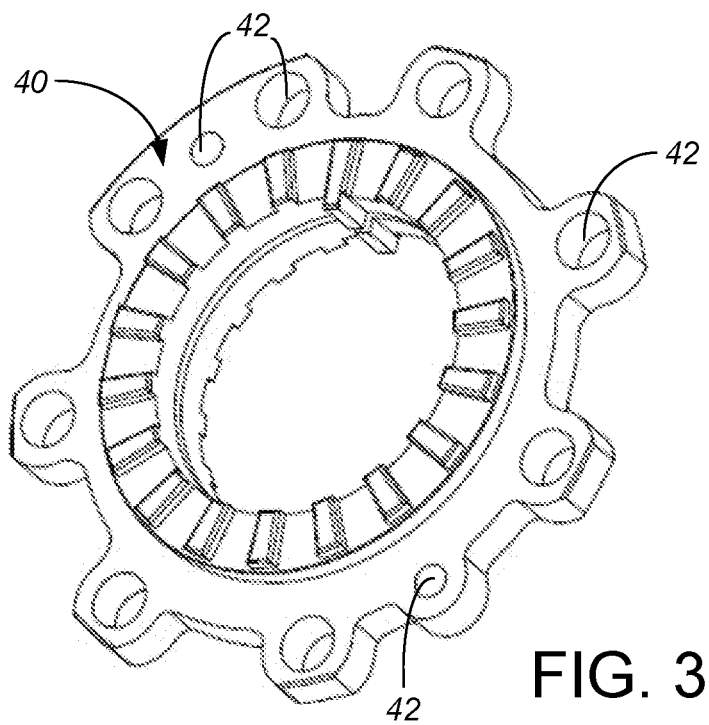
FIG. 3 is a perspective view of the drive ring of U.S. patent application Ser. No. 15/617,414.

The driving ring 40 taught in U.S. patent application Ser. No. 15/617,414 is shown in FIG. 3. It includes a plurality of bolt holes 42 in its outer periphery, and is sandwiched between two housing half shells (not shown) with bolts (not shown) extending in the transverse direction through the bolt holes 42.

Figure 4:
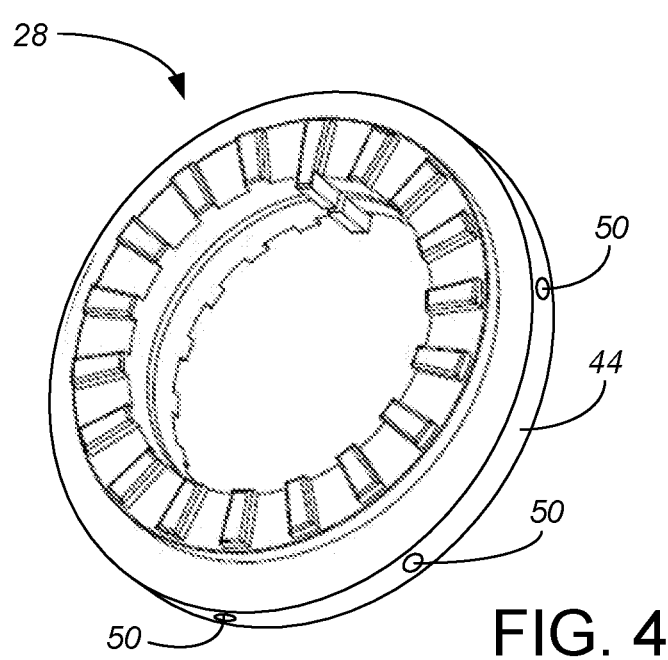
FIG. 4 is a perspective view of a preferred drive ring in accordance with the present invention.

In contrast to the driving ring 40 of U.S. patent application Ser. No. 15/617,414, the driving ring 28 of the present invention as shown in FIG. 4 has a much smaller and simpler outer periphery 44. Instead of being fixed to the housing portions by axially extending bolts, the driving ring 40 of the present invention is fixed to the housing 20 with one or more radially extending shaft pins 46. Moreover, the shaft pins 46 are used in a position that aligns during rotation of the housing 20 with the end of the bevel gear 12. The shaft pins 46 after installation do not extend over the profile of the housing 20, so the input bevel gear 12 can be positioned as close to the differential housing 20 as possible.

In the preferred embodiment, six cylindrical shaft pins 46 are used. Six radially extending holes 48 are formed such as by drilling or other machining through the housing shell 20. Each shaft pin 46 extends radially through its hole 48 and into engagement with the driving ring 28. The preferred shaft pins are 10 mm in diameter and 8.5 mm in length.

In the preferred embodiment shown in FIG. 4, the driving ring 28 includes six radially extending recesses 50 in its outer periphery, each recess 50 receiving one shaft pin 46. Each shaft pin 46 preferably has an interference fit, both with the housing 20 and with the driving ring 28. The shaft pins 46 positively connect the driving ring 28 to the differential housing 20, preventing any potential for slippage. The shaft pins 46 are much smaller, lighter and less obtrusive that the bolts used with the driving ring 40 of U.S. patent application Ser. No. 15/617,414. For instance, by having each shaft pin 46 be wider in diameter than in length, the shaft pins 46 neither extend outward too far to obstruct the input bevel gear 12 nor inward too far to interfere with the snap ring 32 of the central ramping separator ring 30. Further, the cylindrical shaft pins 46 can be formed of proper metal materials and heat treatment to be more shear-resistant than bolts of the same outer diameter. Additionally, because the shaft pins 46 have no external threads, there is no gap between external threads which contributes to a potential shear location.

Figures 5, 6, 7:
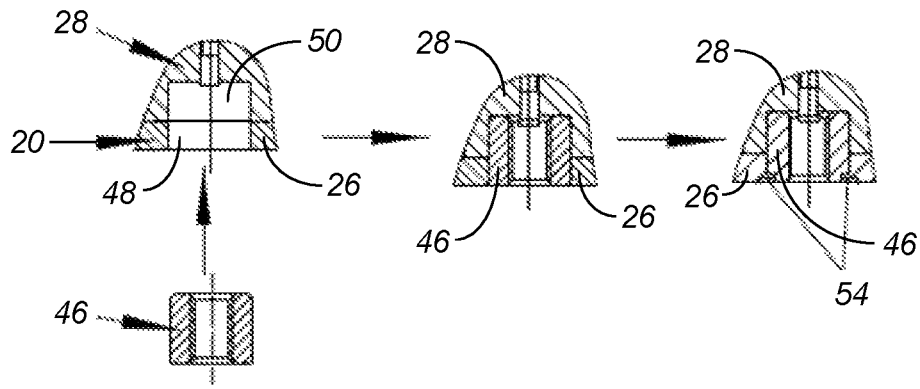
FIGS. 5, 6 and 7 are cross-sectional views, showing the steps of attaching the drive ring into the differential housing in accordance with the present invention.

FIGS. 5-7 depict the method of using the shaft pins 46 to attach the driving ring 28 within the housing 20 of the present invention. First the right side active components 27 and the driving ring 28 are positioned within the housing 20. In the preferred embodiment of the housing 20, the housing 20 includes a slightly stepped inner diameter 52, so general axial alignment of the recesses 50 of the driving ring 28 relative to the shaft pin 46 holes 48 through the housing 20 is easily accomplished. The driving ring 28 is circumferentially positioned so the six recesses 50 line up circumferentially with the six shaft pin holes 48.

In one alternative embodiment, the driving ring 28 can have a flat (not shown) or key (not shown) on its outer periphery with aligns with a corresponding flat (not shown) or key (not shown) on the inner diameter of the housing 20, to assist in achieving the desired circumferential correspondence between the driving ring 28 and the housing 20 during assembly.

In another alternative embodiment, instead of six separate recesses 50, the driving ring 28 can have a single circumferential groove (not shown) extending 360° around its periphery which receives all of the shaft pins 46 in an interference fit. Such an alternative embodiment is particularly available because the circumferential position correspondence of the drive ring 28 to the housing 20 is unimportant to the operation of the differential 10, so long as there is no slippage of the driving ring 28 to the housing 20 after assembly.

After the driving ring 28 is in its desire position relative to the housing 20, the six shaft pins 46 are driven or punched in radially. At this time, if desired, the rest of the differential 10 can be assembled including the left side active components. The differential 10 can be tested, and adjustments to the radial positioning of the driving ring 28 can be made such as by further driving of one or more of the shaft pins 46. After it is verified that the differential 10 is properly assembled and smoothly operating, two small rivets 54 are used to secure the axial position of each of the shaft pins 46 and to ensure that the shaft pins 46 do not unintentionally back out during years of use of the differential 10. This assembly procedure is easier, more foolproof, and faster than the prior art assembly process using transversely directed bolts.

Figures 8, 9, 10:
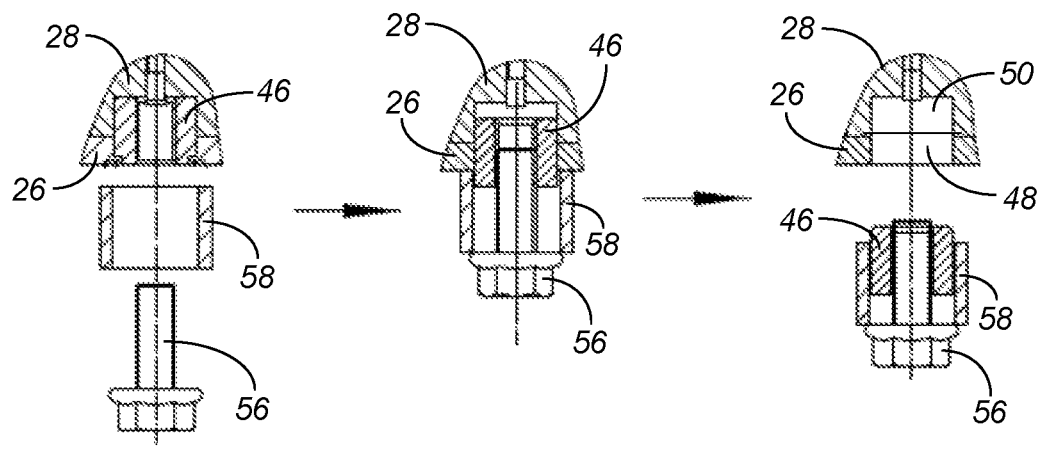
FIGS. 8, 9 and 10 are cross-sectional views, showing the steps of disassembling the drive ring from the differential housing in accordance with the present invention.

The shaft pin 46 of the present invention also includes features to make disassembly of the differential 10 easier. The inside diameter of each shaft pin 46 is preferably threaded. By having internal threads, a bolt 56 can later be inserted to allow disassembly as shown in FIGS. 8-10. First a hollow cylindrical spacer 58 is positioned over and around the shaft pin 46. A bolt 56 is then threaded into the internal threads of the shaft pin 46. Either the bolt head can be used for a pull force, or more preferably the bolt 56 is simply torqued further forward, pulling the shaft pin 46 from its hole 48.

Although the present invention has been described with reference to preferred embodiments, workers skilled in the art will recognize that changes may be made in form and detail without departing from the spirit and scope of the invention.

The invention claimed is:

1. A mechanical locking differential comprising:
a housing secured to a ring gear for receiving torque from an input bevel gear, the housing having at least one radially extending recess defined therein;
a driving ring having a plurality of drive teeth on each of two sides, the driving ring being rotationally driven about its axis by the housing, the driving ring having at least one radially extending recess defined in a periphery of the driving ring;
active components on either side of the driving ring and within the housing to transmit torque to two outputs rotating about the axis, such that the outputs can either be locked relative to the driving ring or be unlocked relative to the driving ring;
wherein the driving ring is secured in place relative to the housing by at least one radially directed shaft pin extending through the at least one radially extending recess of the housing and into the radially extending recess of the periphery of the driving ring, such that the shaft pin mates with both the housing and the driving ring with an interference fit to positively connect the driving ring to the housing, preventing any potential for slippage between the driving ring and the housing.

2. A mechanical locking differential comprising:
a housing secured to a ring gear for receiving torque from an input bevel gear;
a driving ring having a plurality of drive teeth on each of two sides, the driving ring being rotationally driven about its axis by the housing;
active components on either side of the driving ring and within the housing to transmit torque to two outputs rotating about the axis, such that the outputs can either be locked relative to the driving ring or be unlocked relative to the driving ring;

wherein the driving ring is secured in place relative to the housing by at least one radially directed shaft pin extending through the housing and into a periphery of the driving ring, wherein the shaft pin is hollow and cylindrical.

3. The mechanical locking differential of claim 2, wherein an inner diameter of the shaft pin is threaded.

4. A mechanical locking differential comprising:
a housing secured to a ring gear for receiving torque from an input bevel gear;
a driving ring having a plurality of drive teeth on each of two sides, the driving ring being rotationally driven about its axis by the housing;
active components on either side of the driving ring and within the housing to transmit torque to two outputs rotating about the axis, such that the outputs can either be locked relative to the driving ring or be unlocked relative to the driving ring;
wherein the driving ring is secured in place relative to the housing by at least one radially directed shaft pin extending through the housing and into a periphery of the driving ring, wherein the shaft pin is secured in place from axial backing out by two rivets.

5. The mechanical locking differential of claim 1, wherein the driving ring is in line with the input bevel gear.

6. The mechanical locking differential of claim 4, wherein the shaft pin is received in a recess in the periphery of the driving ring.

7. The mechanical locking differential of claim 4, wherein the shaft pin mates with both the housing and the driving ring with an interference fit.

8. A mechanical locking differential comprising:
a housing secured to a ring gear for receiving torque from an input bevel gear;
a driving ring having a plurality of drive teeth on each of two sides, the driving ring being rotationally driven about its axis by the housing;
active components on either side of the driving ring and within the housing to transmit torque to two outputs rotating about the axis, such that the outputs can either be locked relative to the driving ring or be unlocked relative to the driving ring;
wherein the driving ring is secured in place relative to the housing by at least one radially directed shaft pin extending through the housing and into a periphery of the driving ring, wherein the housing comprises a stepped inner diameter to set an axial position of the driving ring.

9. The mechanical locking differential of claim 1, wherein the housing defines a shell around the active components.

10. A method of assembling a mechanical locking differential, comprising:
placing one of right or left active components into a housing, the housing being adapted to receive torque from an input bevel gear for rotation about a transverse axis, the housing having at least one radially extending recess defined therein;
placing a driving ring having a plurality of drive teeth on each of two sides into the housing, the driving ring having at least one radially extending recess defined in a periphery of the driving ring;
placing the other of right or left active components into the housing, such that when assembled outputs of the differential can either be locked relative to the driving ring or be unlocked relative to the driving ring; and
securing the driving ring in place relative to the housing by driving at least one shaft pin radially through the at least one radially extending recess of the housing and into the at least one radially extending recess in the periphery of the driving ring, such that the shaft pin mates with both the housing and the driving ring with an interference fit to positively connect the driving ring to the housing, preventing any potential for slippage between the driving ring and the housing.

11. The method of claim 10, further comprising:
bolting a drive ring gear to the housing.

12. The method of claim 11 using a plurality of shaft pins, wherein the drive ring gear defines a position of an input bevel gear with respect to the housing, and wherein the shaft pins are in line with the input bevel gear during rotation of the housing about the transverse axis.

13. A method of assembling a mechanical locking differential, comprising:
placing one of right or left active components into a housing, the housing being adapted to receive torque from an input bevel gear for rotation about a transverse axis;
placing a driving ring having a plurality of drive teeth on each of two sides into the housing;
placing the other of right or left active components into the housing, such that when assembled outputs of the differential can either be locked relative to the driving ring or be unlocked relative to the driving ring;
securing the driving ring in place relative to the housing by driving at least one shaft pin radially through the housing and into a periphery of the driving ring; and
riveting two rivets to prevent the shaft pin from backing out during use of the differential.

14. A method of assembling a mechanical locking differential, comprising:
placing one of right or left active components into a housing, the housing being adapted to receive torque from an input bevel gear for rotation about a transverse axis;
placing a driving ring having a plurality of drive teeth on each of two sides into the housing, wherein the act of placing the driving ring into the housing causes the driving ring to abut a stepped inner diameter of the housing;
placing the other of right or left active components into the housing, such that when assembled outputs of the differential can either be locked relative to the driving ring or be unlocked relative to the driving ring; and
securing the driving ring in place relative to the housing by driving at least one shaft pin radially through the housing and into a periphery of the driving ring.

15. A method of disassembling a mechanical locking differential, comprising:
placing a hollow spacer into contact with a housing of the differential over a shaft pin, the shaft pin extending radially through the housing and into a periphery of a driving ring, a driving ring having a plurality of drive teeth on each of two sides within the housing, such that when assembled outputs of the differential can either be locked relative to the driving ring or be unlocked relative to the driving ring, the shaft pin being hollow with interior threads;
threading a removal bolt into threaded engagement with the interior threads of the shaft pin; and
further torquing the removal bolt so it pulls the shaft pin out of the periphery of the driving ring.

* * * * *